United States Patent [19]

Pinard

[11] Patent Number: 5,191,447
[45] Date of Patent: Mar. 2, 1993

[54] SCANNING BEAM CONTROL SYSTEM WITH TRANSLATED REFERENCE SCALE

[75] Inventor: Alward I. Pinard, Westford, Mass.

[73] Assignee: Intergraph Corporation, Huntsville, Ala.

[21] Appl. No.: 626,582

[22] Filed: Dec. 7, 1990

[51] Int. Cl.⁵ .............................................. H04N 1/04
[52] U.S. Cl. .................................... 358/497; 358/474; 358/481; 358/494; 250/234; 250/235
[58] Field of Search ............... 358/474, 480, 481, 497, 358/494; 250/208.1, 578, 235, 234

[56] References Cited

U.S. PATENT DOCUMENTS

| | | | |
|---|---|---|---|
| 3,752,558 | 8/1973 | Lloyd | 35/6 |
| 4,447,723 | 5/1984 | Neumann | 250/236 |
| 4,584,612 | 4/1986 | Ono | 358/285 |
| 4,649,437 | 3/1987 | Watanabe | 358/286 |
| 4,661,699 | 4/1987 | Welmers et al. | 250/235 |
| 4,806,753 | 2/1989 | Noguchi | 250/235 |
| 4,816,920 | 3/1989 | Paulsen | 358/474 |
| 4,827,126 | 5/1989 | Tanaka | 250/235 |
| 4,832,429 | 5/1989 | Nagler | 350/6.8 |
| 4,931,637 | 6/1992 | Succari et al. | 250/235 |

Primary Examiner—Edward L. Coles, Sr.
Assistant Examiner—Fan Lee
Attorney, Agent, or Firm—Bromberg & Sunstein

[57] ABSTRACT

A scanning system, having a fixed platen and optical imaging system and a translated reference scale, is provided for scanning of a modulated light beam (or a set of parallel, independently modulated light beams) onto an object surface. The optical system provides a combined light beam including the modulated light beam and a reference light beam. An optical imaging device moves the combined light beam along a scan line, and a translatably mounted beam splitter splits the combined light beam to direct at least some of the reference light beam onto a reference scale and a sensor. The reference scale sensor, which is rigidly attached to the beam splitter, and is responsive to reference beam position in two directions, provides a clocking signal indicative of beam position along the scan line and a vernier position signal indicative of beam position in a direction transverse to the scan line. An optical stepper controls the translation of the beam splitter such as to position precisely each of a series of scans in a direction transverse to the scan lines.

20 Claims, 7 Drawing Sheets

SCANNING BEAM CONTROL SYSTEM WITH TRANSLATED REFERENCE SCALE

TECHNICAL FIELD

The present invention pertains to scanning systems for use in laser plotters (also known as scanners) and document scanners, particularly those of the flatbed type.

BACKGROUND ART

Flatbed scanning systems are well known in the art. See, for example, U.S. Pat. No. 3,752,558 for an invention by Lloyd. In high speed scanning systems such as precision plotters, printers, and the like, a number of problems are encountered in exactly locating image pixels throughout an object field format, particularly a flat format. The scanning beam, which is moved transversely across an object plane, often has non-constant velocity and must traverse non-uniform path lengths. Errors can thus occur in the direction of the scan (herein called the Y direction) due to optical distortion, scanner speed, projection of the scan onto a flat format, or simply because of vibration of the equipment. Errors can also occur in a direction transverse the direction of the scan (herein called the X direction) due to scan inaccuracies such as facet orthogonality error (i.e., non-orthogonality of the faces of the scanning polygon to a line from the center of rotation), facet radii error (i.e., error of distance of facet from center of rotation), bearing wobble, air turbulence, mechanical tolerances, vibration, table drive errors, and the like; such errors may affect the linearity as well as placement of a line of pixels, and thus affect the vertical resolution of the system. While modern scanning systems may use focused beams of the order of 15 $\mu$m in diameter and pixels spaced at one half mil (0.013 mm) intervals between centers, mechanical and optical systems typically achieve such resolutions at great expense. Fixed platen systems of the prior art do not provide a basis for economically achieving such resolutions in both X and Y directions.

U.S. Pat. No. 4,661,699, for an invention by Welmers et al., which is hereby incorporated herein by reference, discloses a moving platen scanning system for controlling the scanning of a single beam of modulated coherent light onto a flat object plane using a bi-directional reference scale. The system splits a laser beam prior to modulation and directs an auxiliary, unmodulated, reference beam in parallel with the modulated beam. The unmodulated reference beam can be distinguished from the modulated beam by a small divergence from the modulated beam or by different polarization. The beams are reflected off a rotating polygon and the reference beam is transmitted through the bi-directional reference scale onto a photo detector. This system addresses the need to correct or compensate for errors in both directions in that the data is synchronized to a pixel clock derived from the position of the scanned beam on the bi-directional reference scale.

Scanning systems which have a fixed optical system and require translation of the platen introduce mechanical design difficulties because the platen has high inertia. Furthermore, there are operational disadvantages in that a moving platen scanner is inconvenient to use: fixed platen systems are preferred. Scanning systems which rely on a slight divergence between a modulated beam and a reference beam are sensitive to any local imperfections in every optical surface encountered by the two beams. As fixed size and spacing is reduced, this sensitivity becomes more critical. In all modern high-resolution scanning systems the time taken to scan a whole document is of concern. As pixel size and spacing is reduced, more scan lines are required to cover a given document. Systems that scan every raster line in sequence take a long time to scan the whole document because the time to scan the whole document increases in proportion to the number of raster lines and there is an upper limit on the rotational speed of a spinning polygon scanner.

DISCLOSURE OF INVENTION

The present invention provides an improvement over the invention of U.S. Pat. No. 4,661,699. In accordance with a preferred embodiment of the present invention, a scanning system, having a fixed platen and optical imaging system and a translated reference scale, is provided for scanning of a modulated light beam (or a set of parallel, independently modulated light beams) onto an object surface. The apparatus includes light source means for providing a combined light beam including a modulated light beam and a reference light beam, optical imaging means for moving the combined light beam along a scan line, beam splitter means, translatably mounted, for splitting the combined light beam such that at least some of the modulated light beam continues in one direction and at least some of the reference light beam continues in another direction, reference scale sensor means including a reference scale, rigidly attached to the beam splitter means, positioned so as to receive the reference light beam after it leaves the beam splitter means, and responsive to reference beam position in two directions, for providing a clocking signal indicative of beam position along the scan line and a vernier position signal indicative of beam position in a direction transverse to the scan line and optical stepping means for controlling the translation of the beam splitter means such as to position precisely each of a series of scans in a direction transverse to the scan lines.

BRIEF DESCRIPTION OF THE DRAWINGS

FIGS. 4a, 4b and 4c are schematic representations of the control and error correction systems for alternate methods of generating and controlling multiple light beams, FIGS. 4a and 4b show the use of gas lasers and FIG. 4c shows the use of diode lasers;

DETAILED DESCRIPTION OF SPECIFIC EMBODIMENTS

The function of the system is to place pixels at precise locations with respect to one another within each of a series of scans.

1. Optical System Overview

Figure 1:
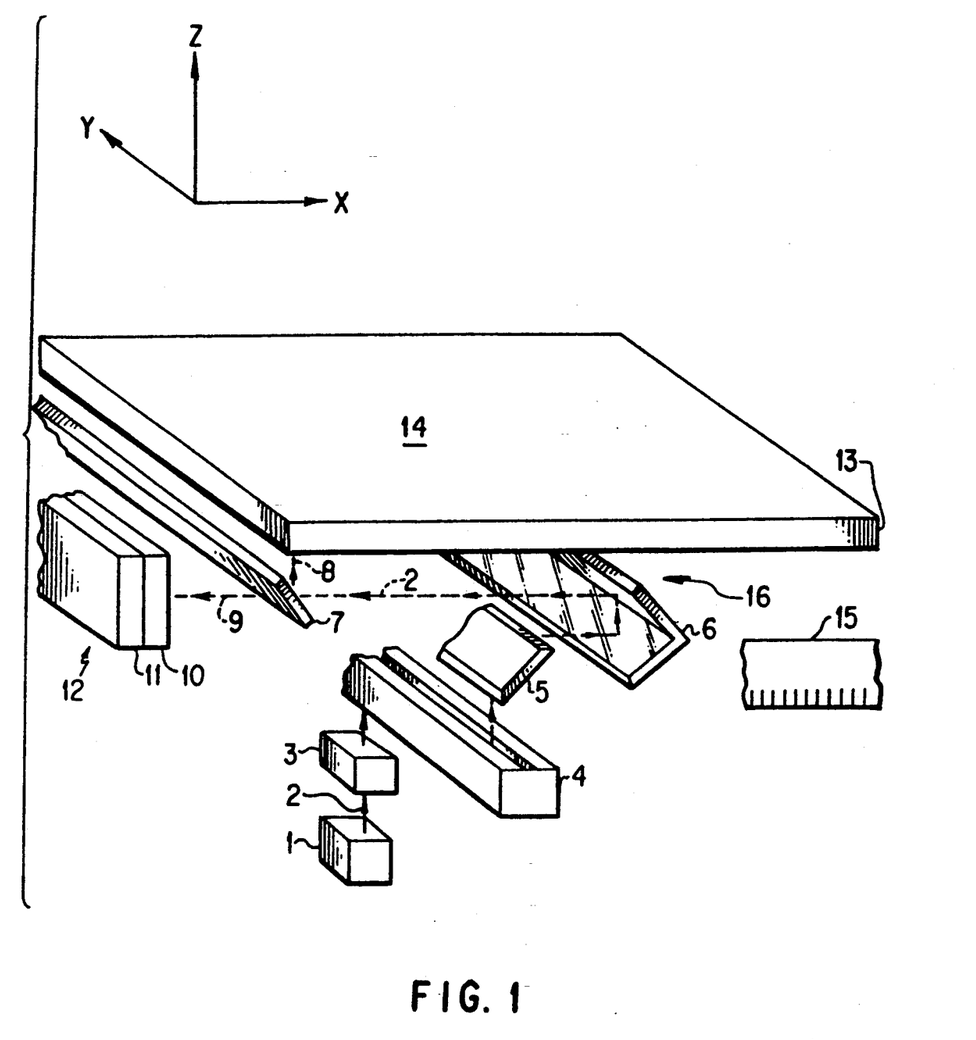
FIG. 1 is a diagrammatic, perspective representation of the optical system of the present invention.

FIG. 1 shows the optical system of a preferred embodiment. The optical system comprises a beam mixer (1) which combines a modulated beam and a reference beam so that they are co-linear within a combined beam (2), a beam direction adjuster (3) which makes fine adjustment of the beam in the X direction, an optical imaging system (4) which scans the modulated beam across a flat image plane in the Y direction, keeping the beam in focus across the scan. The optical system further comprises a fixed mirror (5), a 180° mirror (6), a splitter mirror (7), a platen (13) that defines the image plane (14), a reference scale (10) and a photo-detector system (11). The splitter mirror separates the combined light beam into its modulated component (8) and its reference component (9). The reference scale and the photo-detector system together comprise a reference scale assembly. The optical system of a preferred embodiment of the present invention contains some elements of the optical system described in U.S. Pat. No. 4,661,699, most notably the optical imaging system (4) and the reference scale (10). However, other optical systems and other reference systems could be used.

Figure 2A:
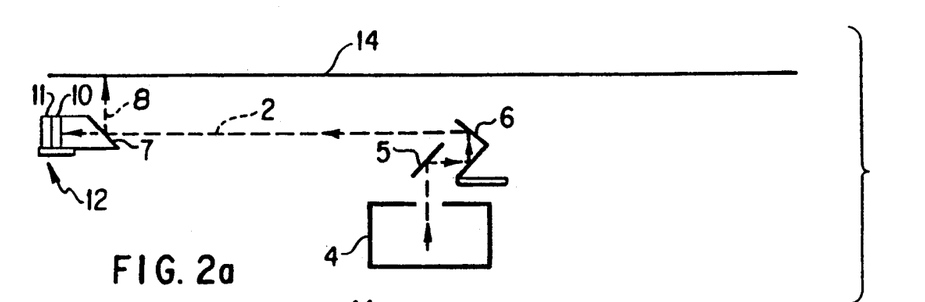
FIGS. 2a, 2b and 2c show the operation of the optical path length equalization system.
Figure 2B:
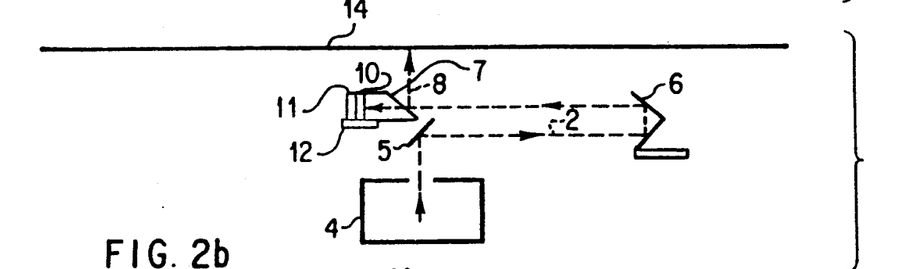
Figure 2C:
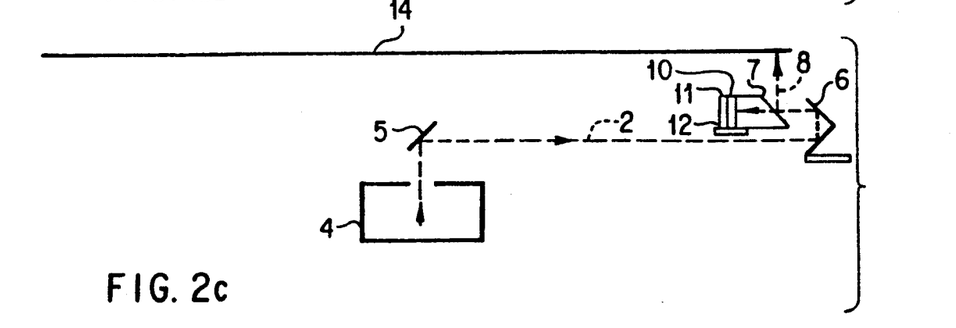
Figure 4A:
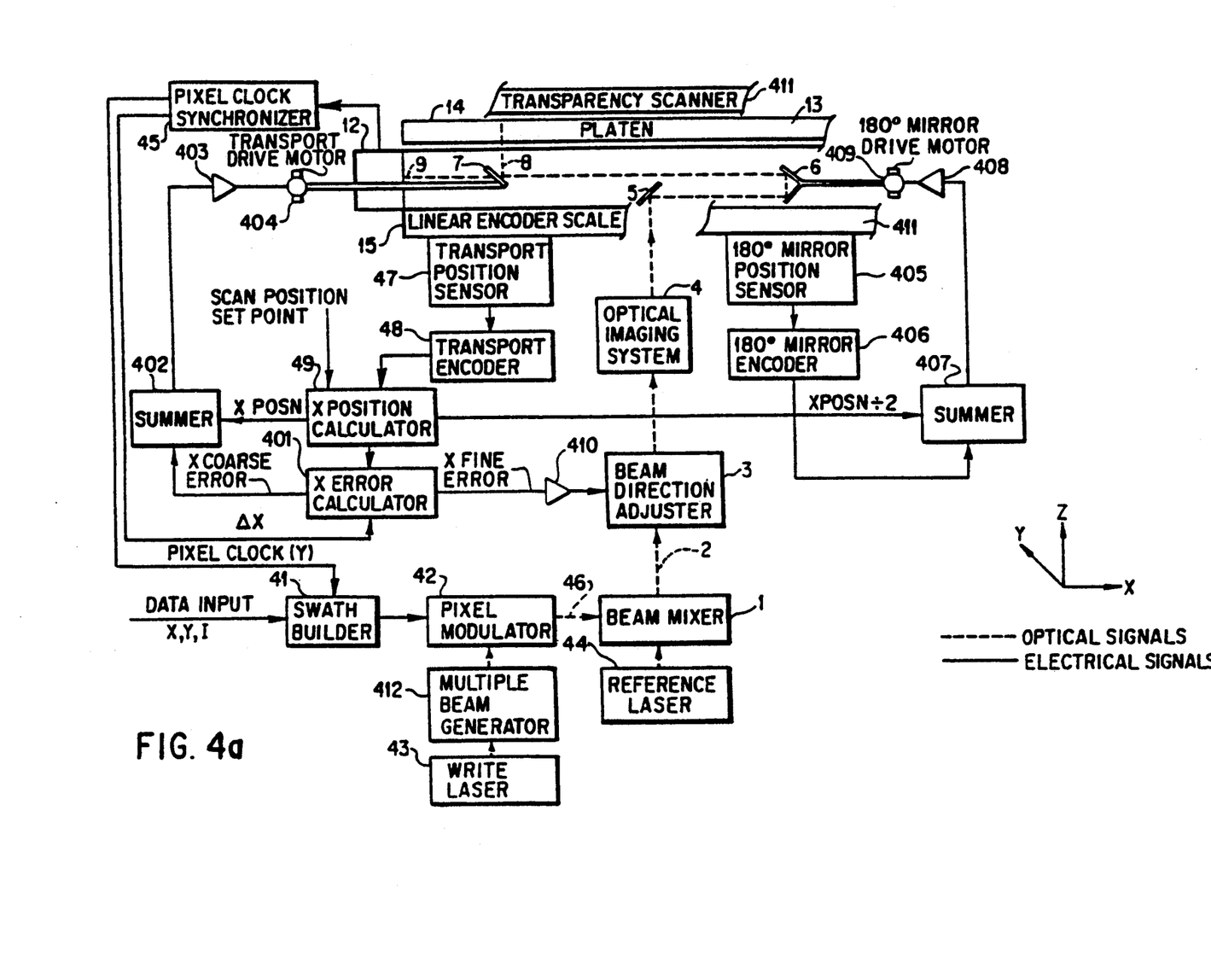

An accurate optical transport system, hereinbelow referred to as the transport system, positions the reference scale assembly (12) to a precise X position commanded by the control electronics with respect to linear reference scale (15). Thus, the splitter mirror (7), which is part of the reference scale assembly (12) positions the scanned beam precisely along the platen in the X direction. For each new scan the transport system positions the reference scale assembly (12) precisely in the X direction. Referring now to FIG. 4a, X position calculator (49) and transport drive motor (404) drive the reference scale assembly (12) to the required position based on a scan position setpoint received by X position calculator (49). Another function of the transport system is to assure that the beam remains in focus on the platen by maintaining the length of the optical path between the optical imaging system (4) and the image plane (14) at a constant value. Operation of the path length equalization system is shown in FIGS. 2a, 2b and 2c. The optical components of the path length equalization system (16) are fixed mirror (5), 180° mirror (6) and splitter mirror (7). The transport system moves the 180° mirror half the distance traversed by the reference scale assembly. Mirrors (6) and (7) are both positioned accurately with respect to the same linear reference scale (15). In a preferred embodiment the 180° mirror is moved with respect to the linear reference scale by a second drive motor. In another embodiment this relative movement is accomplished through a 2:1 mechanical reduction drive.

Fixed mirror (5) and 180° mirror (6) rotate the optical axis to a direction parallel to the platen (13) so that the bulky optical imaging system may be mounted more conveniently and occupy less space.

Splitter mirror (7), part of the reference scale sensor assembly (12), directs the modulated component of the combined light beam (8) onto the platen and the reference component (9) onto the reference scale sensor. The invention may use polarizing optics to differentiate the reference beam from the writing beam or it may use two lasers, a write laser which uses one wavelength for the writing beam and a reference laser which uses a different wavelength for the reference beam. In a preferred embodiment the system uses a blue argon laser for the writing beam and a helium neon laser for the reference beam. Solid state laser diodes may be used to generate write beams and reference beams. Referring to FIG. 4a, in place of the write laser (43), the Multiple Beam Generator (412) and the pixel modulator (42) m laser diodes may be used. FIG. 4c shows m laser diodes (413) whose output is individually controlled.

Swath builder (41) generates m parallel signals that modulate m diodes. The magnification and rotation assembly (415) spaces and adjusts the pixel position for system addressability. The reference laser, a diode, is of a different frequency so that it can be directed onto the precision scale. The spacing in the swath direction is corrected by the magnification and rotation assembly. The reference beam may be differentiated by polarization as an alternative to differentiation by frequency.

2. Reference Scale and Clocking

Figure 3A:
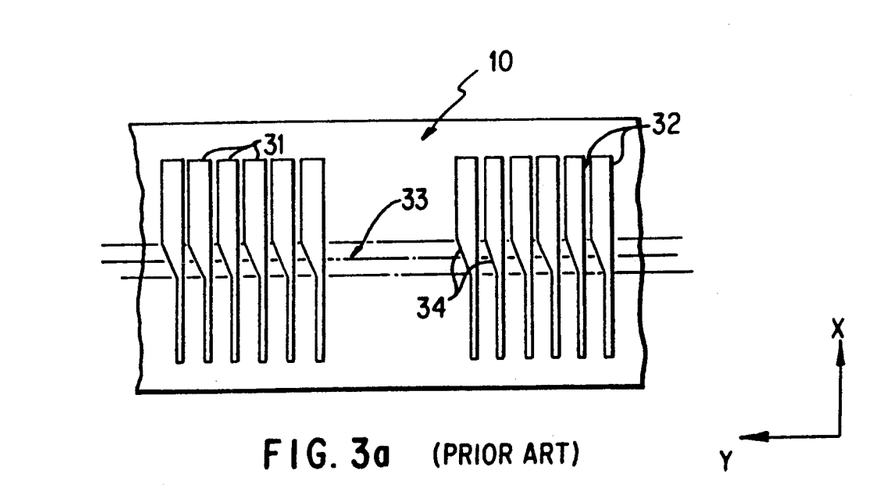
FIG. 3a shows the reference scale.

The Reference Scale shown in FIG. 3a is the same reference scale that is described in U.S. Pat. No. 4,661,699. A set of indicia forming spokes (31), which have a different transparency than the rest of the scale, have leading edges (32), center line (33), and trailing edges (34). Optical imaging system (4) contains a polygon scanner which scans the combined beam in the Y direction. The polygon scanner has a high momentum so it is used as the master clock to generate pixel clock signals. Pixel clock signals are generated when the scan, scanning in the Y direction, crosses leading edges (32) of reference scale (10) and is detected by the reference scale sensor. Pixel clock signals are shaped in pixel clock synchronizer (45) and are used to synchronize swath builder (41). X deviation vernier signals are generated when the beam, scanning in the Y direction, crosses the angled section of trailing edges (34) of reference scale (10) and is detected by the reference scale sensor (12). These signals are shaped in pixel clock synchronizer (45) and used to correct the position of the beam in the X direction.

3. Beam Building

Figure 5A:
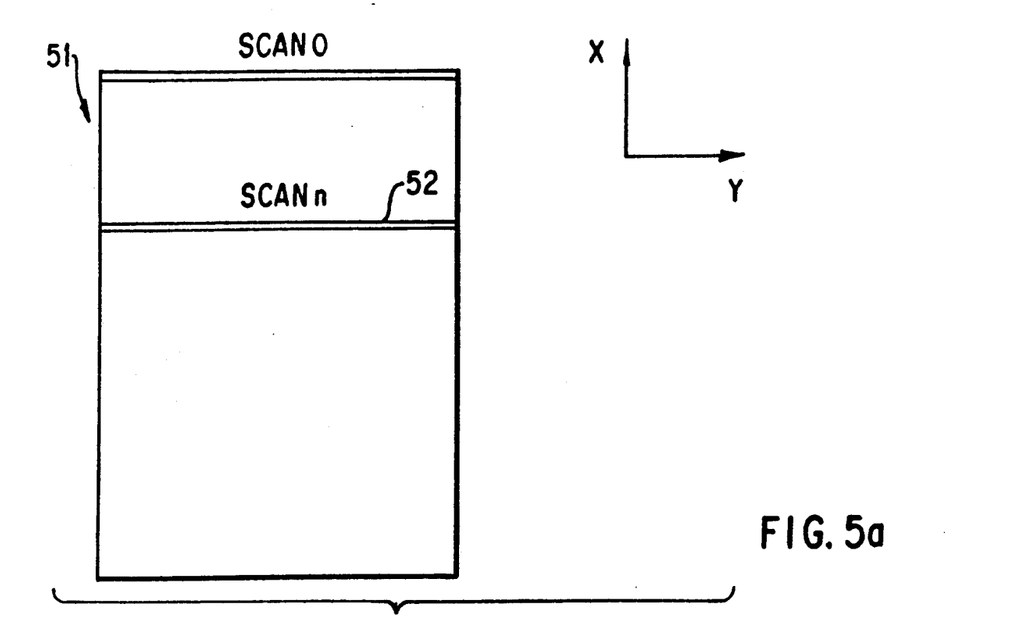
FIG. 5a shows scan lines crossing the image plane.
Figure 5B:
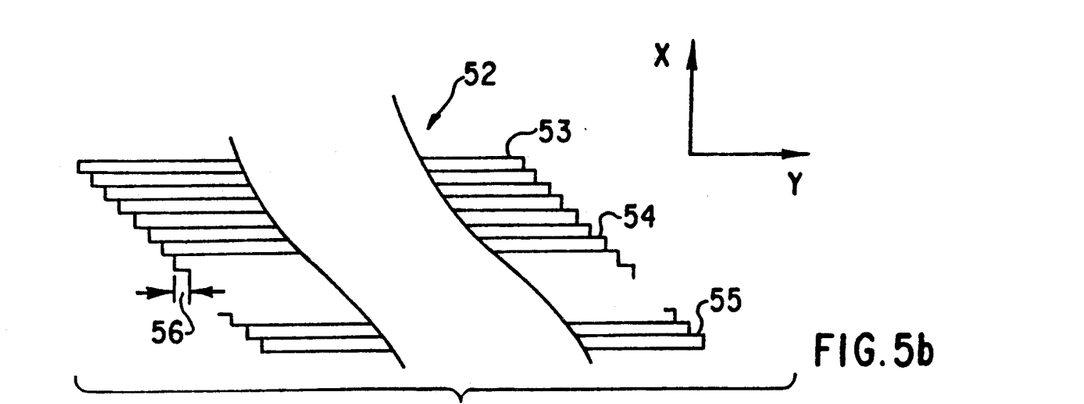
FIG. 5b shows a single scan line comprising a swath of m raster lines.

In a preferred embodiment of the invention, to maximize the pixel writing rate, the writing beam is composed of m multiple parallel beams. FIGS. 5a and 5b show m parallel beams plotting a swath (52). These m parallel beams are represented by parallel raster lines (53), (54) and (55) in FIG. 5b. These beams are processed in parallel and written simultaneously.

Figure 4B:
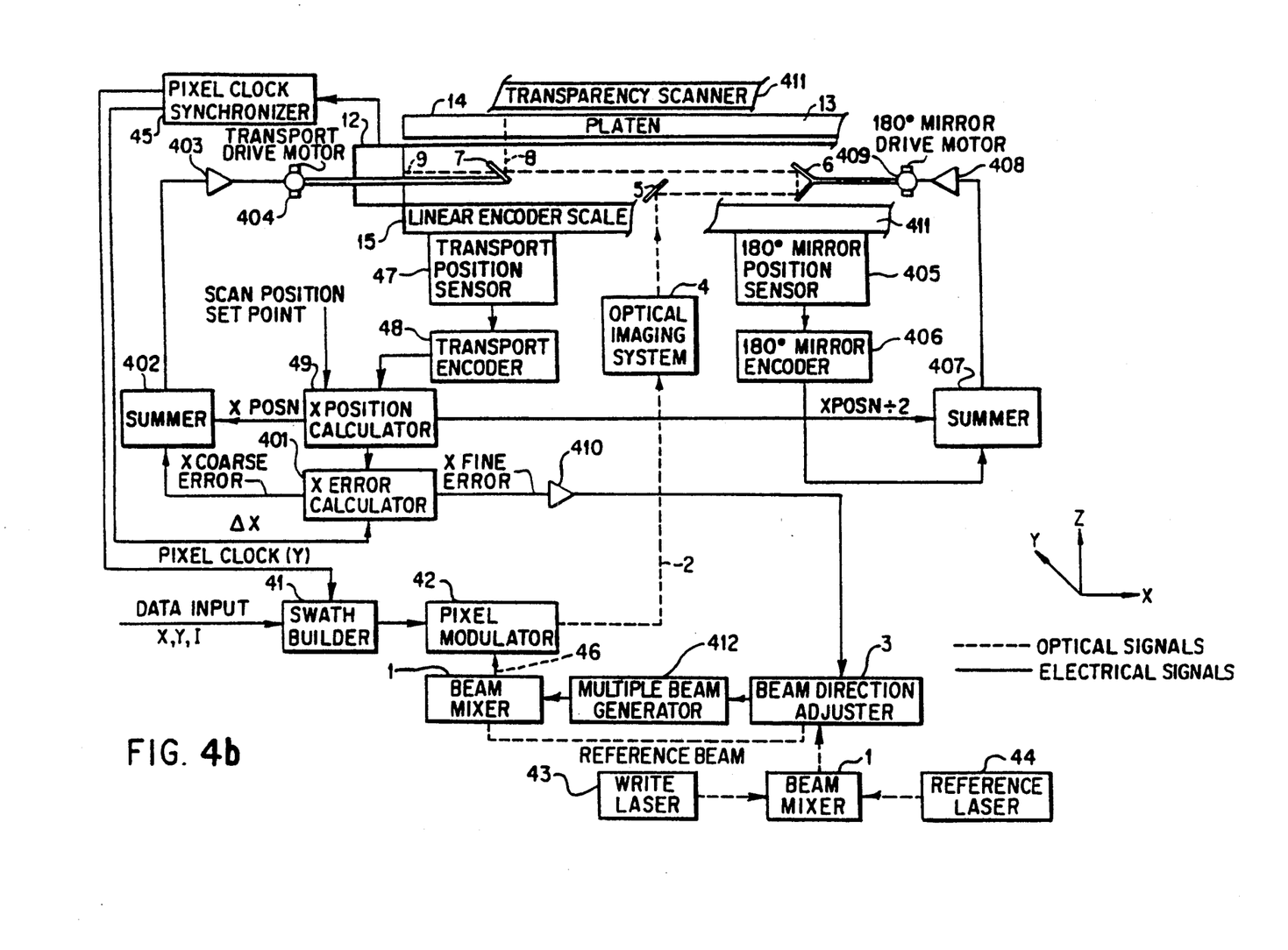
Figure 4C:
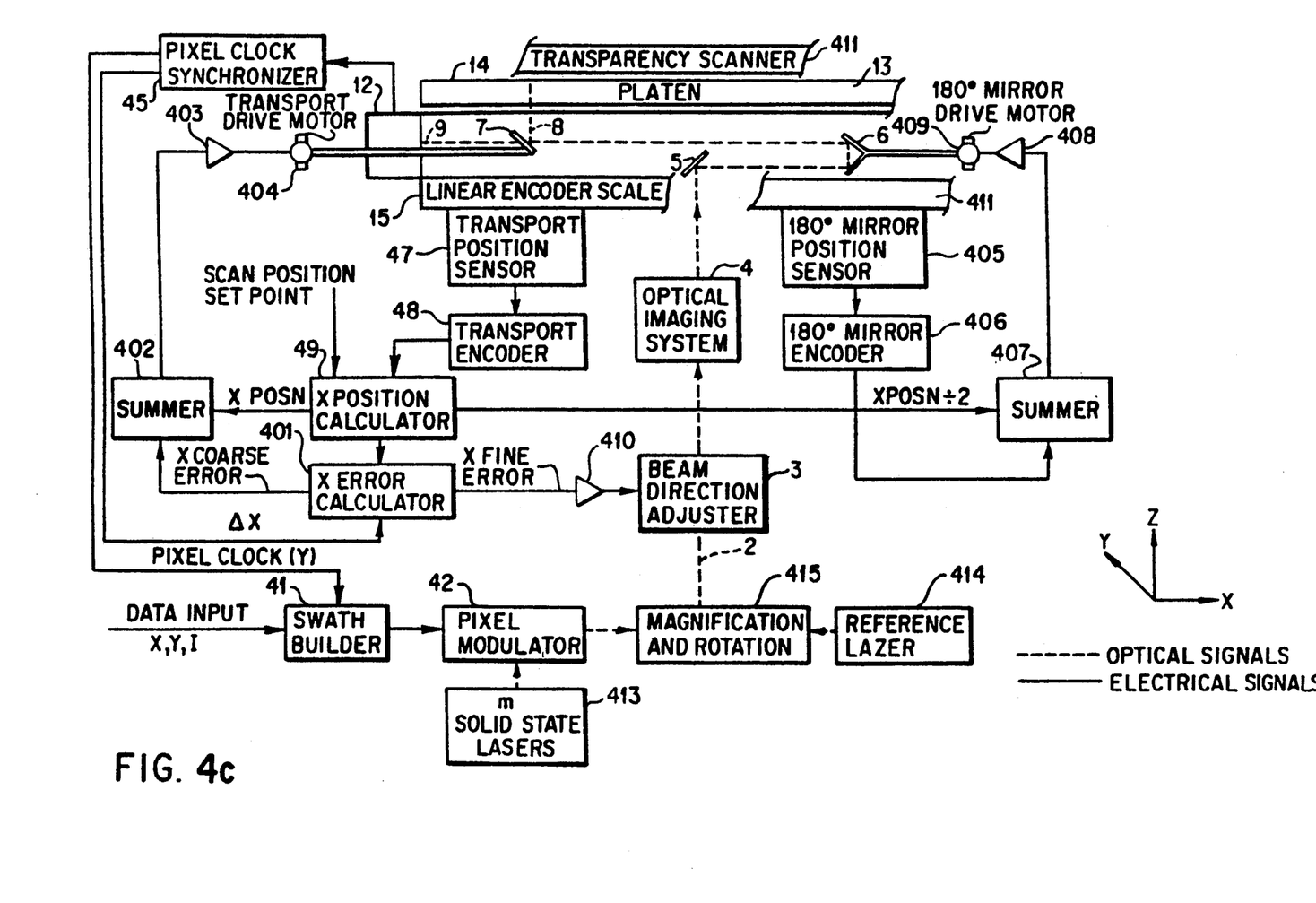

Referring now to FIGS. 4a and 4b, pixel clock synchronizer (45) transmits pixel clock signals to the swath builder (41). In the swath builder, data input signals (X, Y, and Intensity) are combined with pixel clock signals to provide m parallel electronic signals to the pixel modulator (42). The write laser (43) directs a single beam of coherent light into the multiple beam generator (412). The multiple beam generator separates the single beam into a swath of multiple, substantially parallel beams. The swath of m parallel unmodulated lights beams is directed into the pixel modulator (42). The pixel modulator modulates each beam in the swath of beams with corresponding signals from the swath builder. The output of the pixel modulator is a swath (46) of parallel modulated beams. The modulation, i.e., the intensity, of each of these beams is thus individually controlled to allow imaging of the separate pixels. (One approach for achieving this result is described in U.S. Patent application Ser. No. 325,212, filed Mar. 17, 1989, which is herein incorporated by reference.) This allows electronic adjustment of pixel intensity (and thus size) to correct for systematic errors such as facet errors, exposure time, etc. Additionally, the number of beams produced by the multiple beam generator may be reduced by n to avoid moires resulting from beat frequencies that might arise in the generation of patterned images such as screening. This swath (or beam) enters beam mixer (1) where it is combined with the reference beam from reference laser (44), or a polarized reference beam. The output of the beam mixer is combined beam (2), a co-linear combination of the swath and the reference beam.

When solid state lasers are used, the write gas laser and the multiple beam generator of FIG. 4a are replaced by m solid state lasers (413) as shown in FIG. 4c. In this embodiment the reference gas laser in FIG. 4a is replaced by a reference solid state laser (414) and the beam mixer of FIG. 4a is replaced by a magnification and rotation assembly (415). The rest of the control system is the same as in FIGS. 4a and 4b.

4. Scan Positioning

The scan positioning function is shown in FIG. 4a. Scan positioning refers to successive movements in the X direction necessary to go from one scan line to the next. All movement is made with respect to linear encoder scale (15). Position data acquired by transport position sensor (47) is transmitted to transport encoder (48) and from there into X position calculator (49). The X position calculator functions as a controller so as to drive the reference scale assembly to the position defined by the scan position setpoint. The X position signal from the X position calculator is transmitted to summer (402) and from there to transport drive amplifier (403). This amplifier drives transport drive motor (404) which in turn drives reference scale assembly (12). The X position calculator also provides an output to drive the 180° mirror. This signal, X position ÷2, passes through summer (407) and 180° mirror drive amplifier (408) to drive 180° mirror drive motor (409). This motor positions 180° mirror (6).

FIGS. 4a and 4b show alternative configurations of the beam direction adjustment system. FIG. 4a shows beam direction adjustment performed after multiple beam generation and modulation. FIG. 4b shows beam direction adjustment performed before multiple beam generation and modulation. In the embodiments described hereinabove the reference beam has a wavelength different from that of the modulated beam. Alternatively, a polarized reference beam could be used as descried in U.S. Pat. No. 3,752,558.

5. Scan Position (Coarse) Error Correction

The scan position (coarse) error correction system is a closed loop control system. Transport position sensor (47) derives a signal indicative of the position of reference scale assembly (12) with respect to linear encoder scale (15). The output of transport position sensor (47) is fed to transport encoder (48) and from there, into X error calculator (401). The output of the X error calculator is an X coarse error signal which enters summer (402). Output of the summer goes via amplifier (403) to drive motor (404) which moves the reference scale assembly to reduce the error. This system corrects for large, low-frequency errors.

6. Fine Error Correction

Deviations from the precise location in X are introduced in part by facet error, bearing wobble, air turbulence, mechanical tolerances, vibration, electronic drift, servo response, and errors introduced by the 180° mirror. Thus within a scan, for each Y position of a pixel, a precise X position error correction is required. The fine error correction system is a closed loop control system. Pixel clock synchronizer (45), which receives pixel clocking signals from the leading edge of the reference scale, also receives X deviation vernier signals from the center portion of the trailing edge of the reference scale indicia as described above. Pixel clock synchronizer (45) provides a signal ($\Delta X$) indicative of X direction error to X error calculator (401). The fine error signal from the X error calculator goes via amplifier (410) to beam direction adjustor (3). The beam direction adjustor in a preferred embodiment is an acousto-optic modulator. By control of the acousto-optic modulator frequency, combined beam (2) is finely steered in the X direction to reduce the error. This system corrects for high-frequency errors. As the acoustooptic modulator is wavelength dependent, a scale factor corrects for it in the control electronics.

7. Path Length Error Correction

Path length errors occur when the path length between the optical imaging system and the object or image plane deviates from the desired path length by an amount that exceeds the focal length error budget. Such errors are calculated from the difference between the output signal of transport encoder (48) divided by 2 and the output of the 180° mirror encoder (406). The path length error correction system is a closed loop control system. Summer (407) receives a position signal from 180° mirror position sensor (405) via 180° encoder (406). Summer (407) compares this signal with the desired position (X position ÷2). The resulting output signal, amplified by amplifier (408) powers 180° mirror drive motor (409) which drives the 180° mirror in a direction such as to reduce the error. Alternatively, the mirrors may be mechanically linked and path length coarse error correction made by servo adjustment of the position of one of the mirror systems (preferably the 180 mirror) from its anchor point.

8. Interference Suppression

Referring to FIG. 5b, to avoid optical interference between adjacent beams, the beams are offset by an integral number of pixels along the raster lines in the Y direction. The raster line offset is shown as (56) in FIG. 5b. The data in the control electronics is offset by a corresponding amount.

9. Addressability Adjustment

Addressability is pixel spacing, i.e., the distance between the center of two adjacent pixels. The addressability in the X direction may be different than the addressability in the Y direction. Also the addressability in each direction, in the present invention, may be separately adjusted. In the Y direction, the pixel spacing may be changed by changing the frequency of the pixel clock. In the X direction, the pixel spacing corresponds to the distance between two beams at the surface of the document being scanned. Thus the pixel spacing may be changed by changing the beam separation either optically or electrooptically. In the preferred embodiment of the present invention a gas laser is used and acousto-optic modulators are used to modulate the multiple parallel beams. The deflection angle of each modulated beam is related to the carrier frequency of the modulating signal. Changing the carrier frequency of the modulators changes the angle of the beams and therefore the separation of the beams at the document. Thus the addressability in the X direction is controlled by selecting the appropriate carrier frequencies for the pixel modulators. These methods of addressability adjustment may be used in conjunction with varying the number of beams as described hereinbelow.

10. Matching a Requested Screening Frequency

To avoid undesirable artifacts, the inverse of the screening frequency should be an integral multiple of the addressability. For a given screening frequency the addressability can be selected to meet this requirement. To match other screening frequencies, a number of parallel beams that is less than the number provided may be used. In a preferred embodiment, eight parallel beams are provided and a lesser number of beams (in the range 1–7) may be used. For example, a system having 8 parallel beams and an addressability of 0.5 mil (2000 pixels/inch) supports screening frequencies of 125 dpi and 250 dpi. Reducing the number of beams used to 7 would change the addressability and would make available a different set of screening frequencies (the inverse of each being an integral multiple of the new addressability).

11. Orthogonality

Figure 5C:
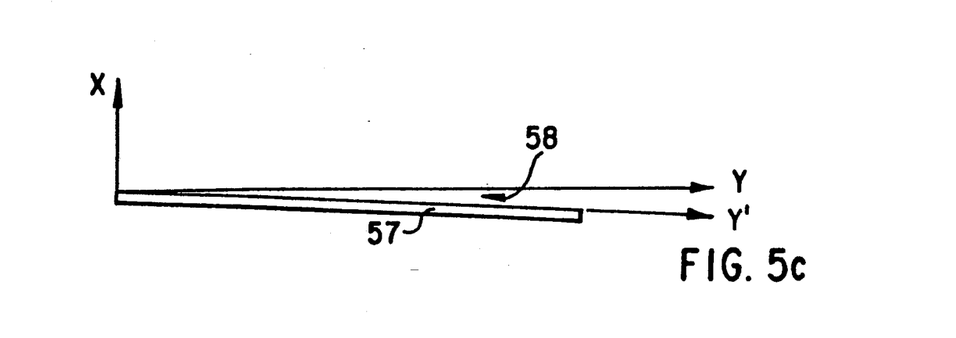

The optical transport system is operated in a constant velocity mode and, to assure orthogonality of the plotted image, the axes X and Y' are made non-perpendicular by the width of the swath as shown in FIG. 5C. The angle of offset against raster line (57) is shown as (58) in FIG. 5c.

Figure 3B:
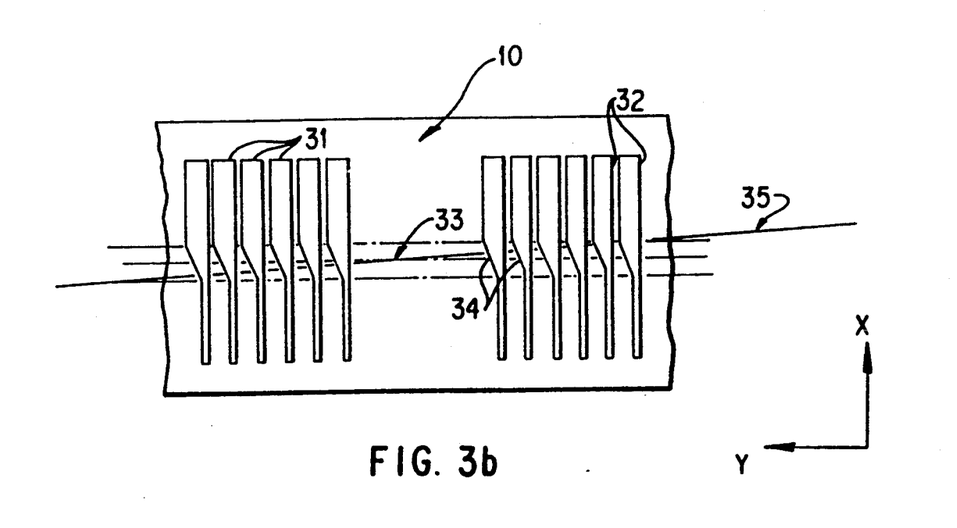
FIG. 3b shows the reference scale as used in the present invention.

The mirror system is driven continuously (constant velocity mode as opposed to step mode) based on a clock derived from the facet mirror. As m beams are written as a swath, a non-orthogonality is introduced. The nonorthogonality is m times the pixel spacing. Provision is made for correcting non-orthogonality by mechanically offsetting the reference scale. Alternatively, the correction for non-orthogonality can be made electronically by changing the duty cycle of the waveform that the reference signals are served to as a function of distance along the reference scale. Referring to FIG. 3b, the control system normally keeps the reference beam on the center line (33). To compensate for non-orthogonality resulting from continuous translation of the beam splitter during a scan, varying the duty cycle linearity (as the reference beam scans from left to right in FIG. 3b) would keep the reference beam on a line such as skew line (35). The angle of skew line (35) may be varied by adjusting the amount the duty cycle varies so that compensation may be adjusted in accordance with the width of the beam swath. Either technique can be used to accommodate the nonorthogonality of different pixel spacings and different numbers of beams.

12. Document Scanning

The system described can scan both transparent and reflective documents. In both cases, a light collection system is connected to the scale transport system and collects light reflected or transmitted by the media. The collection system uses known techniques to collect light along the direction of the swept beam.

What is claimed is:

1. A system for controlling the scanning of a modulated light beam onto an object surface, comprising:
    (a) light source means for providing a combined light beam including a modulated light beam and a reference light beam;
    (b) optical imaging means, having a fixed position in relation to the object surface, for moving the combined light beam along a scan line;
    (c) beam splitter means, in the path of the combined light beam and translatably mounted for translation parallel to the object surface, for splitting the combined light beam such that at least some of the modulated light beam continues in a first direction and at least some of the reference light beam continues in a second direction;
    (d) reference scale sensor means, including a reference scale positioned so as to receive at least some of the reference light beam after it leaves the beam splitter means and responsive to reference beam position in two directions, for providing a clocking signal indicative of beam position along the scan line and a vernier position signal indicative of beam position in a direction transverse to the scan line; and
    (e) translation means for translating the beam splitter means such as to position precisely each of a series of scans in a direction transverse to the scan lines.

2. A system according to claim 1, further including folded beam reflective means, in the path of the combined light beam, for returning the combined light beam on a path parallel to its incoming path;
    wherein the translation means includes means for translating the folded beam reflective means and the beam splitter means in the same direction, parallel to the object surface and transverse to the scan lines, in such a manner as to maintain a fixed optical path length between the optical scanning means and the object surface and keep the modulated light beam in focus at the object surface for each of a series of scans.

3. A system according to claim 2, further including:
    linear encoder scale sensor means for providing a signal indicative of the position of the beam splitter means and a signal indicative of the position of the folded beam reflective means; and
    coarse error correction means for correcting the position of the scan in a direction transverse to the scan line;
    the coarse error correction means further including means for adjusting the distance between the folded beam reflective means and the beam splitter means in such a manner as to correct for errors detected by the linear encoder scale sensor means.

4. A system according to claim 3, further including fine error correction means, having beam direction adjustment means for adjusting the direction of the combined light beam, for providing fine correction of the position of the scan in a direction transverse to the scan lines, the fine error correction means further including means for accepting vernier position signal from the reference scale means and controlling the beam direction adjustment means.

5. A system according to claim 4, wherein the beam direction adjustment means includes an acousto-optic modulator.

6. A system according to claim 5, wherein the acousto-optic modulator further includes means for adjusting the distance between the beams at the object surface.

7. A system according to claim 5, further including electronic circuit means for compensating for wavelength dependent error introduced by the acousto-optic modulator.

8. A system according to claim 1, wherein:
    the light source means further includes means for providing a modulated light beam having single wavelength and a reference light beam having single wavelength that is different from the wavelength of the modulated light beam; and
    the beam splitter means further includes means for spectrally separating the reference light beam from the modulated light beam.

9. A system according to claim 2, wherein the translation means includes mechanical means for moving the beam splitter means, for moving the folded beam reflective means, and for moving the beam splitter means half the distance that it moves the beam splitter means.

10. A system according to claim 2, wherein the translation means includes electrical means for moving the beam splitter means, for moving the folded beam reflective means, and for moving the folded beam reflective means half the distance that it moves the beam splitter means.

11. A system according to claim 1, wherein the object surface is defined by a transparent platen.

12. A system according to claim 1, wherein the light source means further includes means for providing a modulated light beam that comprises multiple, parallel, independently-modulated light beams.

13. A system according to claim 12, further including means for selecting the number of beams in such a manner as to change the distance between adjacent beams at the object surface.

14. A system according to claim 12, further including means for processing in parallel and writing simultaneously as a swath the multiple, parallel, independently-modulated light beams.

15. A system according to claim 14, wherein adjacent beams within the swath are offset in a direction parallel to the scan line in such a manner as to avoid interfering with one another.

16. A system according to claim 15, wherein the swath is radially offset with respect to a datum line on the object surface in such a manner as to assure orthogonality of a scanned image.

17. A system according to claim 1,
wherein the translation means further includes means for translating the beam splitter continuously; and
wherein the system further includes translation compensation means for providing compensation for nonorthogonality resulting from movement of the beam splitter during a scan.

18. A system according to claims 6 or 13,
wherein the translation means further includes means for translating the beam splitter continuously;
wherein the system further includes translation compensation means for providing compensation for nonorthogonality resulting from movement of the beam splitter during a scan; and
wherein the translation compensation means includes means for adjusting the compensation in accordance with the distance between adjacent beams at the object surface.

19. A method for controlling the scanning of a modulated light beam onto an object surface, precisely positioning scan lines in one direction and precisely synchronizing modulation with beam position in a transverse direction, comprising the steps of:
providing a combined light beam including a modulated light beam and a reference light beam;
moving the combined light beam along a scan line;
focussing the modulated light beam at all points along the scan line;
splitting the combined light beam such that at least part of the combined light beam travels along a first path and at least part of the combined light beam travels along a second path;
receiving at least part of the reference light beam from the first path;
providing a clocking signal responsive to the reference beam position on the first path and indicative of the position along the scan line of the part of the modulated beam on the second path;
providing a vernier position signal responsive to the reference beam position and indicative of modulated beam position in a direction transverse to the scan line;
moving at least part of the combined light beam across a fixed object surface to position precisely each of a series of scans in a direction transverse to the scan lines;
maintaining a fixed optical path length from the source of the modulated light beam to the object surface; and
keeping the modulated light beam in focus at the object surface for each of a series of scans.

20. A method for controlling the scanning of multiple, parallel, independently-modulated, coherent light beams onto an object surface, precisely positioning scan lines in one direction and precisely synchronizing modulation with beam position in a transverse direction, comprising the steps of:
providing a combined light beam including multiple, modulated, substantially parallel light beams and a reference light beam;
moving the combined light beam along a scan line;
focussing each of the multiple, modulated, substantially parallel light beams within a swath along the scan line;
splitting the combined light beam such that at least part of the combined light beam travels along a first path and at least part of the combined light beam travels along a second path;
receiving at least part of the reference light beam from the first path;
providing a clocking signal responsive to the reference beam position on the first path and indicative of the position along the scan line of the part of the modulated beam on the second path;
providing a vernier position signal responsive to reference beam position and indicative of modulated beam position in a direction transverse to the scan line;
moving at least part of the combined light beam across a fixed object surface to position precisely each of a series of scans in a direction transverse to the scan lines;
maintaining a fixed optical path length from the source of the modulated light beam to the object surface; and
keeping the modulated light beams in focus at the object surface for each of a series of scans.

* * * * *